United States Patent [19]

Nishigami et al.

[11] Patent Number: 5,435,452
[45] Date of Patent: Jul. 25, 1995

[54] MULTILAYER BOTTLE WITH SEPARABLE LAYER

[75] Inventors: Akira Nishigami; Tetsuzo Nakamura, both of Ibaraki; Masato Honda, Buzen, all of Japan

[73] Assignee: Yoshino Kogyosho Co., Ltd., Tokyo, Japan

[21] Appl. No.: 30,385

[22] PCT Filed: Aug. 5, 1992

[86] PCT No.: PCT/JP92/00997

§ 371 Date: May 5, 1993

§ 102(e) Date: May 5, 1993

[87] PCT Pub. No.: WO93/02926

PCT Pub. Date: Feb. 18, 1993

[30] Foreign Application Priority Data

Aug. 5, 1991 [JP] Japan .................................. 3-195566
May 11, 1992 [JP] Japan .................................. 4-117756

[51] Int. Cl.⁶ .............................................. B65D 23/02
[52] U.S. Cl. ........................................ 215/12.1; 220/410; 220/413
[58] Field of Search .................. 215/12.1, 12.2, 11.3; 220/404, 410, 413, 465, 469

[56] References Cited

U.S. PATENT DOCUMENTS

| 1,035,718 | 8/1912 | Marsters et al. | 220/404 X |
| 2,433,945 | 1/1948 | Foreman | 220/403 X |
| 2,678,764 | 5/1954 | Carlson | 220/404 X |
| 2,866,569 | 12/1958 | Morrison | 215/12.1 |
| 3,039,648 | 6/1962 | Busch | 220/403 X |
| 3,171,571 | 3/1965 | Daniels | 215/11.3 X |
| 3,258,147 | 6/1966 | Rownd | 215/12.1 |
| 3,651,186 | 3/1972 | Hall | 215/1 C X |
| 4,174,783 | 11/1979 | Abe et al. | 215/1 C |
| 4,330,066 | 5/1982 | Berliner | 220/404 X |
| 4,558,792 | 12/1985 | Cabernoch et al. | |
| 4,657,151 | 4/1987 | Cabernoch . | |
| 4,821,896 | 4/1989 | Cheng | 220/404 X |
| 4,892,230 | 1/1990 | Lynn, Jr. | 215/6 X |
| 4,953,750 | 9/1990 | Abernathy | 215/12.1 X |
| 4,979,631 | 12/1990 | Krishnaukumar et al. | 215/12.2 |
| 5,108,805 | 4/1992 | Gerard | 215/12.2 X |
| 5,125,526 | 6/1992 | Sumanis | 220/404 X |
| 5,129,735 | 7/1992 | Neal et al. | 383/109 |
| 5,145,107 | 9/1992 | Silver et al. | 220/469 X |
| 5,242,085 | 9/1993 | Richter et al. | 215/1 C X |
| 5,344,045 | 9/1994 | Richter et al. | 215/1 C X |

FOREIGN PATENT DOCUMENTS 53-141778 12/1978 Japan .
63-272528 11/1988 Japan .
1-176066 7/1989 Japan .
2-8764 1/1990 Japan .

Primary Examiner—Allan N. Shoap
Assistant Examiner—Christopher McDonald
Attorney, Agent, or Firm—Oliff & Berridge

[57] ABSTRACT

In a multilayer bottle having at least two layers including an outer layer and an inner layer according to the present invention, the inner layer and the outer layer adjacent thereto are separable from each other at a body of the bottle while the inner layer and the outer layer are adhered to each other at at least a part thereof in order to prevent the deformation of the bottle due to the reduction of a pressure in the bottle. When the pressure in the bottle reduces due to the volatilization of a content in the bottle or due to the discharge of the content by a pump and the like, the inner layer is separated from the outer layer and is crushed in the form of a bag, so that the outer layer is not deformed at all.

8 Claims, 13 Drawing Sheets

MULTILAYER BOTTLE WITH SEPARABLE LAYER

TECHNICAL FIELD

This invention relates to a multilayer bottle comprising at least two layers, in particular, to a multilayer bottle having an innermost inner layer separable from an outer layer, and to a method of manufacturing the same.

BACKGROUND ART

There is known a multilayer bottle having at least an outer layer and an inner layer which are adhered entirely throughout an overall circumference to be integrated into one so that the outer layer and the inner layer are not separated from each other.

When a long time has passed after the bottle is filled with a content, for example, oxygen and the like in the content may be volatilized to thereby reduce the pressure in the bottle, even if the bottle is tightly sealed.

There is also known a bottle of the type having a pump attached to a mouth of the bottle, in which the pump is operated to discharge a liquid content contained in the bottle. In this bottle also, the pressure in the bottle is reduced as the liquid content is discharged by the pump.

In such an event, a conventional multilayer bottle is disadvantageous in that an outer layer 2, namely, a bottle body is crushed together with an inner layer 1 to change the external configuration of the bottle, as illustrated in FIG. 12. This results in deterioration of a commercial value.

The change in said configuration is indefinite. In so distorted bottle, the content is liable to remain in an irregular portion formed in the inner layer as a result of the distortion, even if the mouth is positioned downwards. Thus, it is difficult to take out the content quantitatively and efficiently.

It is a technical thema of this invention to prevent any change in the external configuration of a bottle due to a reduction of the pressure in the bottle.

DISCLOSURE OF THE INVENTION

In order to accomplish the above-mentioned thema, this invention is constituted as follows.

In a multilayer bottle comprising at least two layers including an outer layer and an inner layer, the inner layer and the outer layer adjacent to the inner layer are separable from each other at a body of the bottle while the inner layer and the outer layer are adhered to each other at at least a part thereof.

According to this invention, it is essential that the inner layer is separable. In this connection, the number of the layers may be any desired number not less than two. In addition, the separable inner layer itself may comprise a plurality of layers.

The inner layer and the outer layer are adhered to each other at at least one of a mouth, a body, and a bottom of the bottle.

More specifically, (a) the inner layer and the outer layer are adhered to each other at the mouth and at an area adjacent to an inner bottom of the bottle;

(b) the inner layer and the outer layer are adhered to each other at the mouth and at the area adjacent to the inner bottom of the bottle in an endless circular fashion along the inner circumferential surface thereof;

(c) the inner layer and the outer layer are adhered to each other at the mouth and at a pinch-off work portion formed on the inner bottom of the bottle;

(d) the inner layer and the outer layer are adhered to each other at the mouth at at least a part thereof;

(e) the inner layer and the outer layer are adhered to each other from the mouth through the body to the bottom in a linear fashion or a zonal fashion.

The inner layer and the outer layer may be entirely adhered at the mouth. On the other hand, the inner layer and the outer layer must not be entirely adhered at the body.

By designating adhering positions between the inner layer and the outer layer, a change in the configuration of the inner layer can be preliminarily specified. It is therefore possible also to efficiently extract the content through the mouth.

In view of the manufacture of the bottle, it is preferable that the inner layer and the outer layer are partly adhered to each other both in the mouth and in the body.

On manufacturing the multilayer bottle, a multilayer parison or a multilayer preform is preliminarily produced. Upon production of the parison or the preform, it is necessary to provide an adhesion layer between at least a part of the inner layer and at least a part of the outer layer in a portion to be molded into the mouth after blow molding. When the adhesion layer is formed, it is not easy to provide the adhesion layer at the mouth alone during extrusion of a cylindrical parison or preform having a plurality of layers, because it is rather easy to provide the adhesion layer over an entire length of extrusion without distinguishing a portion to be molded into the mouth and a portion to be molded into the body.

Thus, the bottle comprising the inner layer and the outer layer linearly adhered to each other from the mouth through the body to the bottom can be molded.

If the inner layer and the outer layer are adhered at the mouth of the bottle, the inner layer is inhibited from being released apart from the outer layer when the inside of the mouth and the opening edge of the mouth are subjected to finishing such as polishing after molding the bottle.

Furthermore, if a through hole is formed on the outer layer in an area except said adhered portion, intake of the air is allowed upon distortion of the inner layer. Thus, it is also possible to prevent the distortion of the outer layer resulting from close contact between the outer layer and the inner layer.

With regard to a method for forming the through hole, it is possible to provide a method of manufacturing a multilayer bottle having at least two layers including the outer layer and the inner layer, comprising the steps of forming the inner layer and the outer layer adjacent thereto so that they are separable from each other at the body of the bottle, adhering the inner layer and the outer layer at the mouth at least a part thereof, inserting a suction pad formed on a front end of a flexible pipe through the mouth into the bottle, attracting a part of the inner layer by the suction pad to separate the part of the inner layer from the outer layer, and boring the through hole, from the outside of the bottle, on the outer layer in the separated area.

Instead of forming the through hole, an overlapped section of the inner layer and the outer layer may be exposed in the exterior of the bottle. For example, if the overlapped section of the inner layer and the outer layer is exposed in the exterior at a fit-off portion (a pinch-off work portion) formed on the bottom of the bottle by a mold during blow molding, an air enters between these layers through the section thereof.

In the multilayer bottle according to this invention, when a long time has passed after the content is filled and the volume of the content is decreased in a tightly sealed state to reduce the pressure in the bottle, or when the content is discharged by a pump or the like to reduce the pressure in the bottle, the inner layer is pulled by the negative pressure to be separated from the outer layer, and the inner layer alone serves as a bag which is contracted and deformed by crushing, so that no change is observed in the external configuration of the bottle. Accordingly, a product quality of the bottle can not be damaged.

It is possible to specify the deformation shape of the bag consisting of the inner layer in the deformation thereof by preliminarily adhering the inner layer and the outer layer at specified positions. Thus, upon occurrence of the deformation of the bag consisting of the inner layer, an efficiently taking out the content can be realized.

Since the bag consisting of the inner layer is evenly crushed, the discharge of the content by the pump is not adversely affected and the content can be smoothly discharged to the end without any remainder left therein.

When the through hole is formed on the outer layer as described above, or when the overlapped section of the outer layer and the inner layer is exposed, an ambient air readily enters between the inner layer and the outer layer to contract the bag consisting of the inner layer.

BEST MODE FOR EMBODYING THE INVENTION

First Embodiment

Figure 1:
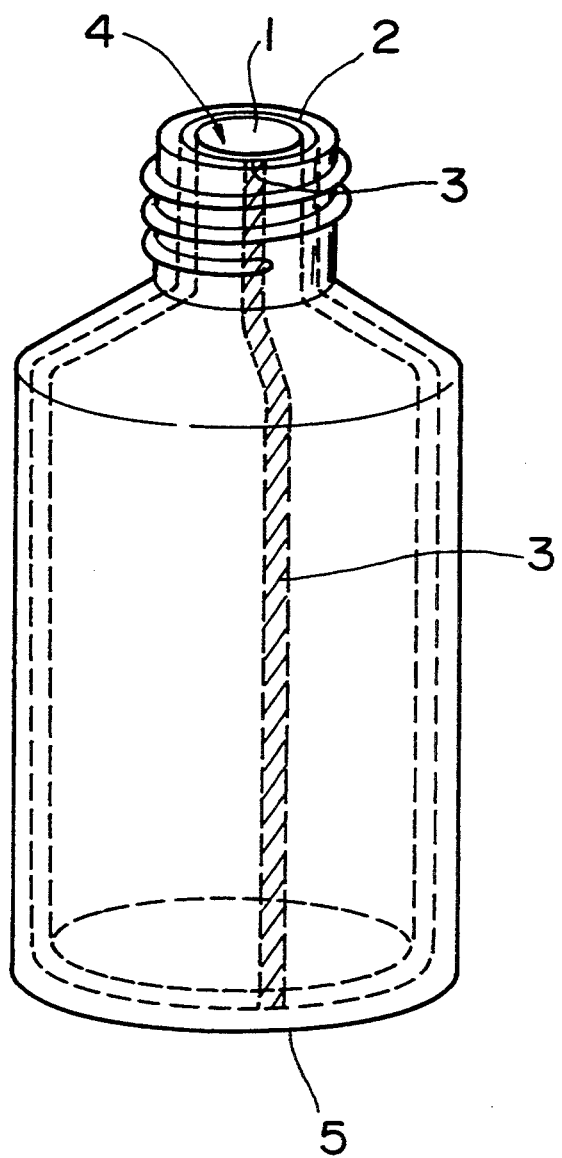
FIG. 1 is a view for describing a multilayer bottle according to a first embodiment of this invention.

Description will be made as regards a first embodiment of this invention with reference to the drawing.

FIG. 1 shows a multilayer bottle comprising two layers including an inner layer 1 and an outer layer 2 according to the first embodiment of this invention. The inner layer 1 and the outer layer 2 are partly adhered to each other through an adhesion layer 3. The outer layer 2 is made of polyethylene. The inner layer 1 is made of nylon. The adhesion layer 3 is made of Admer (trade name).

It is noted here that Admer is an adhesive comprising modified polyolefin and manufactured by Mitsui Petrochemical Industries, Co., Ltd.

Figure 2:
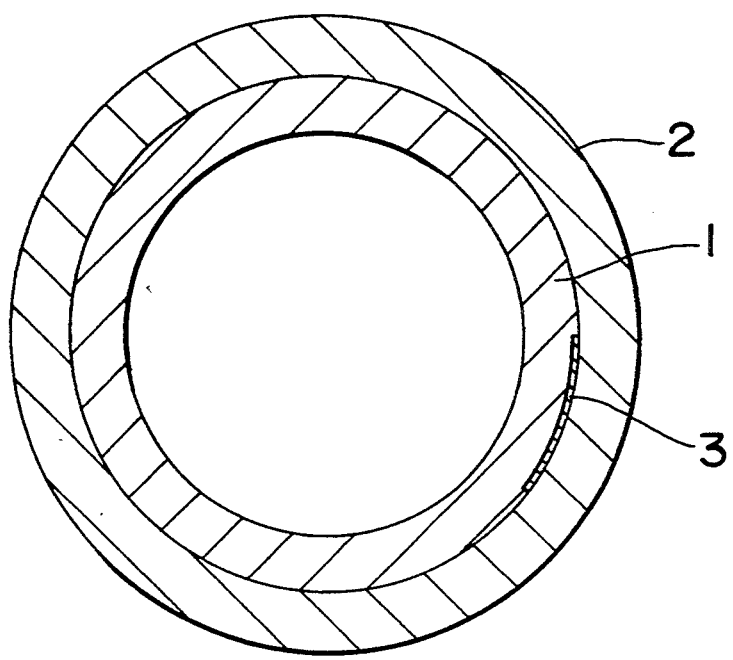
FIG. 2 is a sectional view illustrating a sectional structure of a body of the multilayer bottle according to the first embodiment of this invention.

Referring to FIGS. 1 and 2, said adhesion layer 3 is formed at a part of the outer circumferential surface of the inner layer 1, namely, the inner circumferential surface of the outer layer 2 and vertically extends from a mouth 4 of the bottle to a bottom 5 of the bottle in a zonal fashion. As a result, the outer layer 2 and the inner layer 1 are adhered through the adhesion layer 3 at a part of the bottle. In other words, the outer layer 2 and the inner layer 1 are separable from each other in an area where the adhesion layer 3 is not present.

The bottle according to this invention is manufactured as follows.

At first, a multilayer parison or a multilayer preform having a section similar to that illustrated in FIG. 2 is molded by extrusion or injection molding. The adhesion layer 3 is formed over the entire length of the multilayer parison or the multilayer preform. Then, the multilayer parison or the multilayer preform is set in a blow mold. The bottle illustrated in FIG. 1 is molded by a blow molding technique.

Upon molding, the mouth is subjected to trimming process in order to finish the mouth. In the trimming process, a polishing and removing trimmer is rotated at the mouth to remove a burr and the like around the mouth. Thus, the mouth is finished. At that time, since the inner layer 1 is adhered to the outer layer 2, the inner layer 1 is prevented from being released by the rotation of the trimmer from the outer layer 2 and from being wound around the trimmer. Accordingly, the mouth 4 of the outer layer 2 and the inner layer 1 can be finely and uniformly finished.

Figure 13:
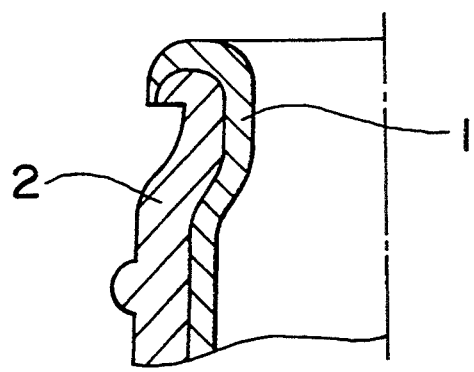
FIG. 13 is a view for describing a structure of a mouth of the conventional multilayer bottle.

A technique for finishing the mouth of the bottle upon molding is disclosed in U.S. patent application Ser. No. 103,624 filed on Jan. 4, 1971 corresponding to Japanese Patent Publication No. Sho 45-31397. The disclosure includes a core rod to be inserted into the mouth, and a sleeve formed at the periphery of the core rod for finishing the mouth. When the core rod is inserted in the mouth of the bottle comprising two layers separable from each other, an inner layer is undesirably pulled by the core rod and dislocated. In order to avoid this, the prior art adopts a structure that the inner layer 1 covers the top of the outer layer 2 at the mouth as illustrated in FIG. 13. Thus, an attempt has been made to avoid downward dislocation. Since the inner layer and the outer layer in the bottle of the present invention are adhered at the mouth of the bottle, the inner layer is never dislocated if the core rod is inserted. Accordingly, it is unnecessary to shape the inner layer at the mouth into the form illustrated in FIG. 13, whereby molding is easy.

This bottle is adapted for storing a liquid, which is a substance in the content, of the type being liable to volatilize even if the bottle is tightly sealed. When a long time has passed after such content is filled, for example, oxygen and the like in the content volatilize to thereby reduce a pressure in the bottle.

In this event, the inner layer 1 is separated from the outer layer 2, so that the inner layer 1 alone is contracted and deformed while the configuration of the outer layer 2, namely, the bottle body is not affected at all.

Second Embodiment

Figure 3:
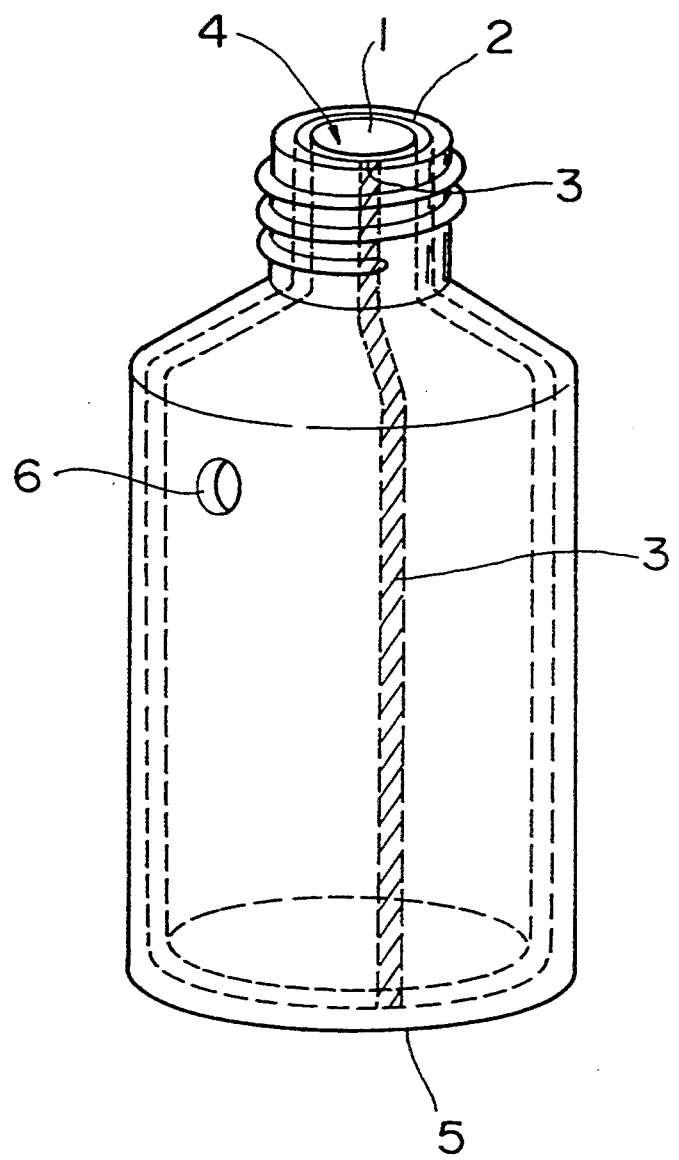
FIG. 3 is a view for describing a multilayer bottle according to a second embodiment of this invention.

FIG. 3 shows another embodiment of this invention.

In this embodiment, the inner layer 1, the outer layer 2, and the adhesion layer 3 are similar in structure to those illustrated in FIG. 1 in conjunction with the first embodiment.

In order to improve the separability of the outer layer 2, this embodiment adopts a structure as follows.

In addition to the above-mentioned structure, the outer layer 2 has a through hole 6 formed at a part thereof.

By the provision of the through hole 6, an air easily enters between the inner layer 1 and the outer layer 2. Accordingly, 2. It is possible to reliably prevent the deformation of the external configuration due to a close contact between these layers.

In this embodiment, the outer layer 2 is made of polyethylene (trade name: CALP) containing calcium carbonate while the inner layer 1 is made of nylon. With this structure, separability is further improved.

Figure 4:
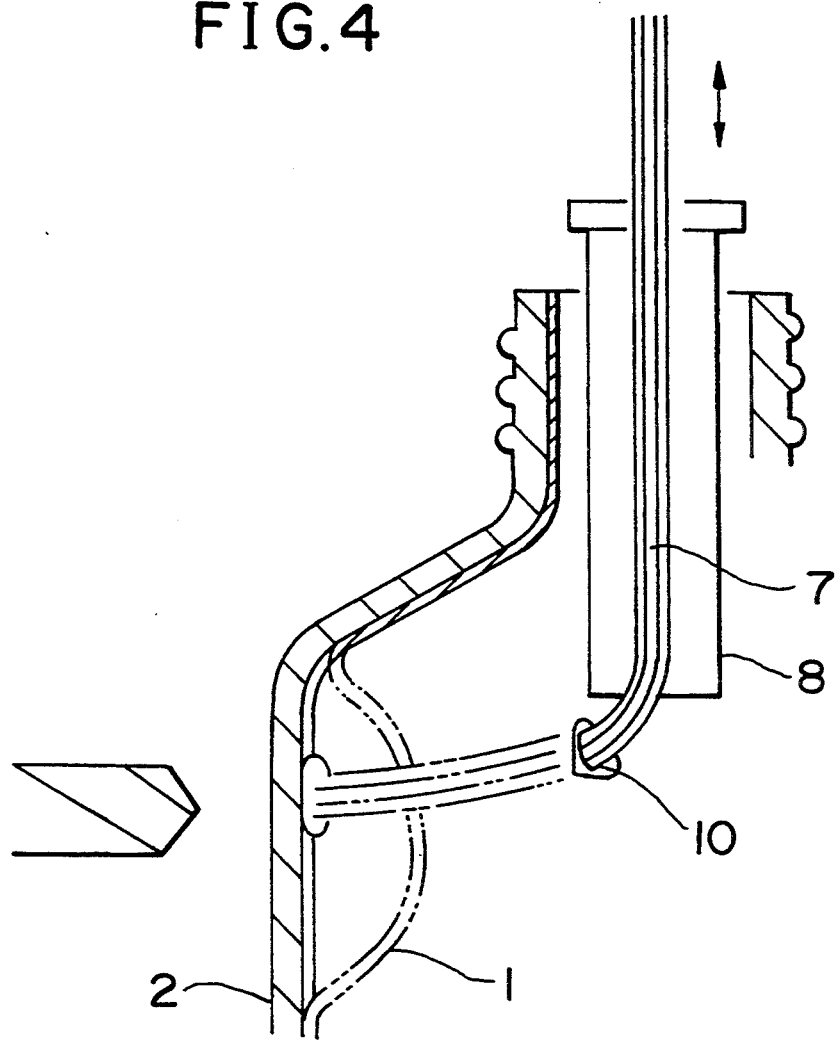
FIG. 4 is a view for describing a method of forming a through hole of the multilayer bottle according to the second embodiment of this invention.

Next referring to FIG. 4, description will be made as regards a process of forming the through hole 6.

At first, a flexible pipe 7 is inserted through the mouth 4. At this time, a cylindrical nozzle guide 8 having a diameter smaller than the mouth 4 may be mounted to guide the insert direction of the flexible pipe 7.

A suction pad 10 is formed at the front end of the flexible pipe 7. By a vacuum pump (not shown) connected to the rear end of the flexible pipe 7, the suction pad 10 is capable of providing suction under a predetermined negative pressure.

Said suction pad 10 is guided to the inner side surface of the bottle to be brought into contact with a part of the inner layer 1. At this time, the contact position of the suction pad 10 is selected at a position where no adhesion layer 3 is present.

As a method for inserting the suction pad 10 through the mouth 4 and for guiding it in a lateral direction, the suction pad 10 may be made of a metal material having a predetermined weight, the bottle body may be laid by its side and the flexible pipe 7 is inserted through the mouth 4, and then the suction pad 10 may be landed onto the inner layer 1 by a gravitational force.

Alternatively, the nozzle guide 8 may be provided with a guide hole (not shown) for guiding the bending direction to the lateral side of the flexible pipe 7 to bring the suction pad 10 into contact with the inner layer 1.

While the suction pad 10 is brought into contact with the inner layer 1 as described above, suction is performed to forcibly separate a part of the inner layer 1 from the outer layer 2.

A separated part, which is obtained in such a manner as described above, is subjected to boring by means of a drill from the outside of the outer layer 2. Thus, the through hole 6 is formed.

Third Embodiment

Figure 5:
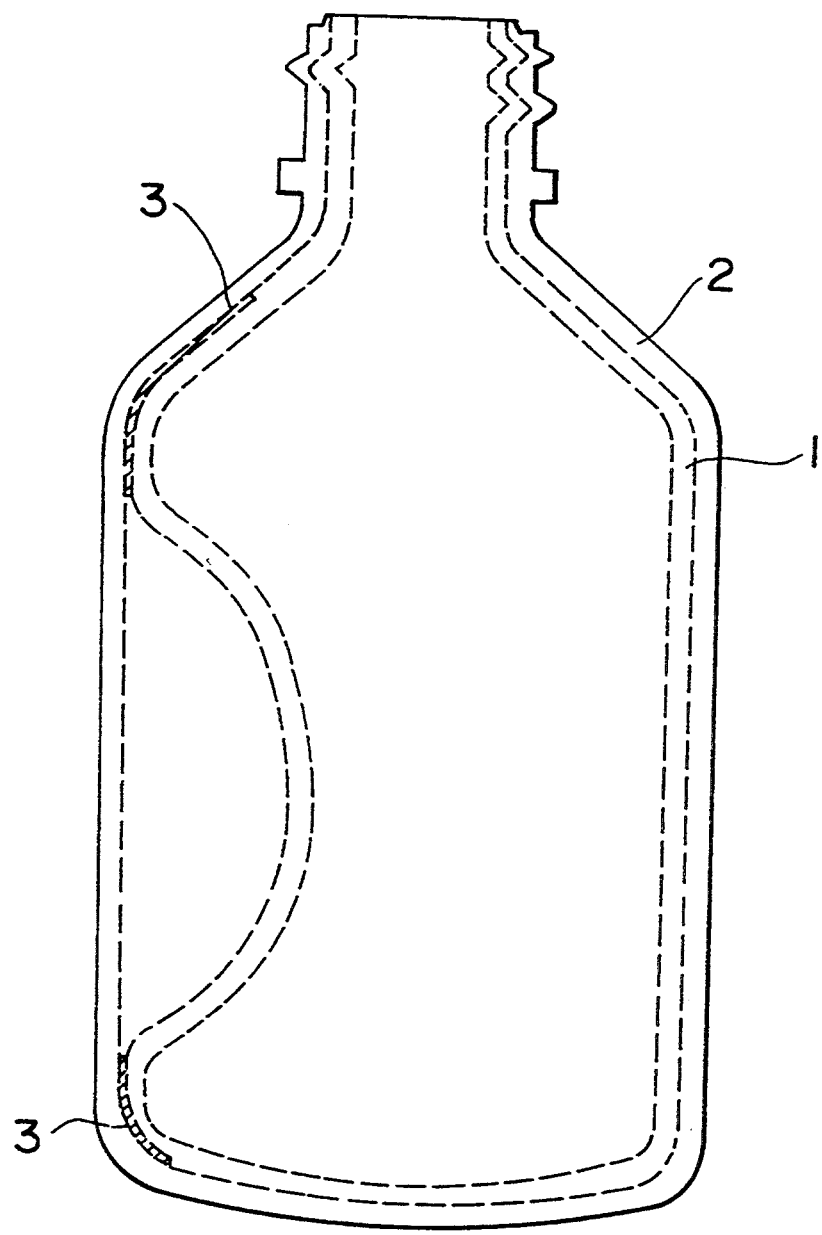
FIG. 5 is a view illustrating a structure of a multilayer bottle according to a third embodiment of this invention.

FIG. 5 shows still another embodiment.

In this embodiment, the adhesion layer 3 is formed at each of a shoulder and an area adjacent to the inner bottom of the bottle.

When, in this embodiment, a pressure in the bottle is reduced as such a center portion of the body of the inner layer 1 is concavely deformed. Accordingly, the inner layer 1 is prevented from being deformed into an indefinite shape. Thus, the shape of the deformation can be specified.

By controlling the deformation into a specific shape as such, it is possible to efficiently take out the content through the mouth 4 when the bottle is turned upside down.

Fourth Embodiment

Figure 6:
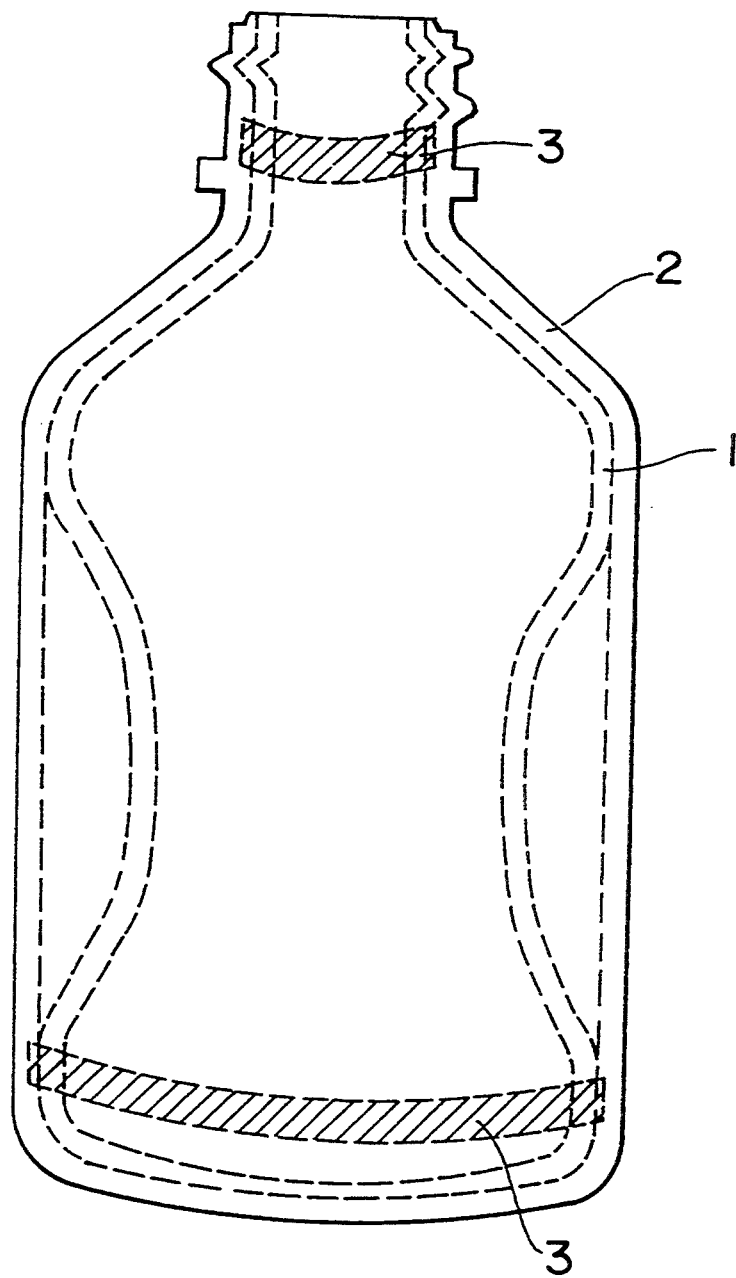
FIG. 6 is a view illustrating a structure of a multilayer bottle according to a fourth embodiment of this invention.

FIG. 6 shows yet another embodiment.

In this embodiment, the adhesion layers 3 are formed in an endless circular fashion at the mouth 4 and at the inner circumferential surface of the area adjacent to the inner bottom of the bottle.

When a pressure in the bottle reduces, the center portion of the body of the inner layer 1 is concavely deformed throughout the entire circumference. Accordingly, it is possible to more efficiently take out the content in this embodiment.

Fifth Embodiment

Figure 7:
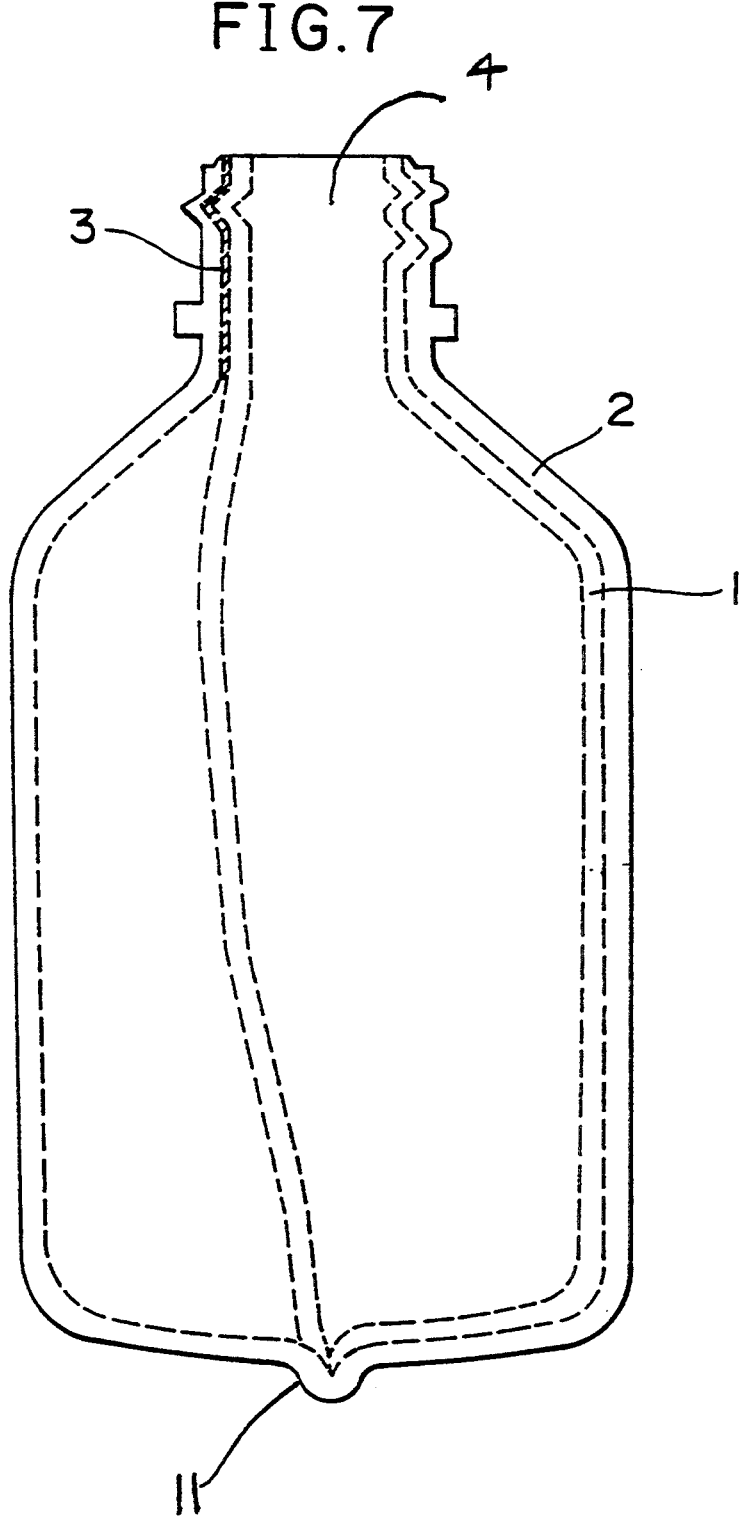
FIG. 7 is a view illustrating a structure of a multilayer bottle according to a fifth embodiment of this invention.

FIG. 7 shows a further embodiment.

In this embodiment, the adhesion layer 3 is formed at the mouth 4. Furthermore, the inner layer 1 is fixed at a pinch-off work portion 11 formed on the inner bottom of the bottle.

In this embodiment, the pinch-off work portion 11 functions substantially as the adhesion layer 3 and the inner layer 1 is fixed to the outer layer 2 at two regions together with said mouth 4.

Thus, in this embodiment, one adhesion layer 3 can be formed simultaneously with the pinch-off work. This improves efficiency in a manufacturing process.

Since the inner layer 1 is fixed at the mouth 4 and at the bottom, taking out the content is also easy.

In each Figure shown in each of said embodiments, only the configuration Of the bottle is shown. It is noted, however, that the mouth of the bottle may be closed by a cap made of synthetic resin and a pump mechanism may be provided to extract a liquid which is the content. When the pump mechanism is provided, an inner pressure in the bottle is rapidly reduced into a negative pressure by operation of the pump, so that the deformation of the external configuration of the bottle is a particular concern. However, according to each of the foregoing embodiments, the external appearance is not affected at all since the inner layer 1 alone is deformed.

Sixth Embodiment

Figure 8:
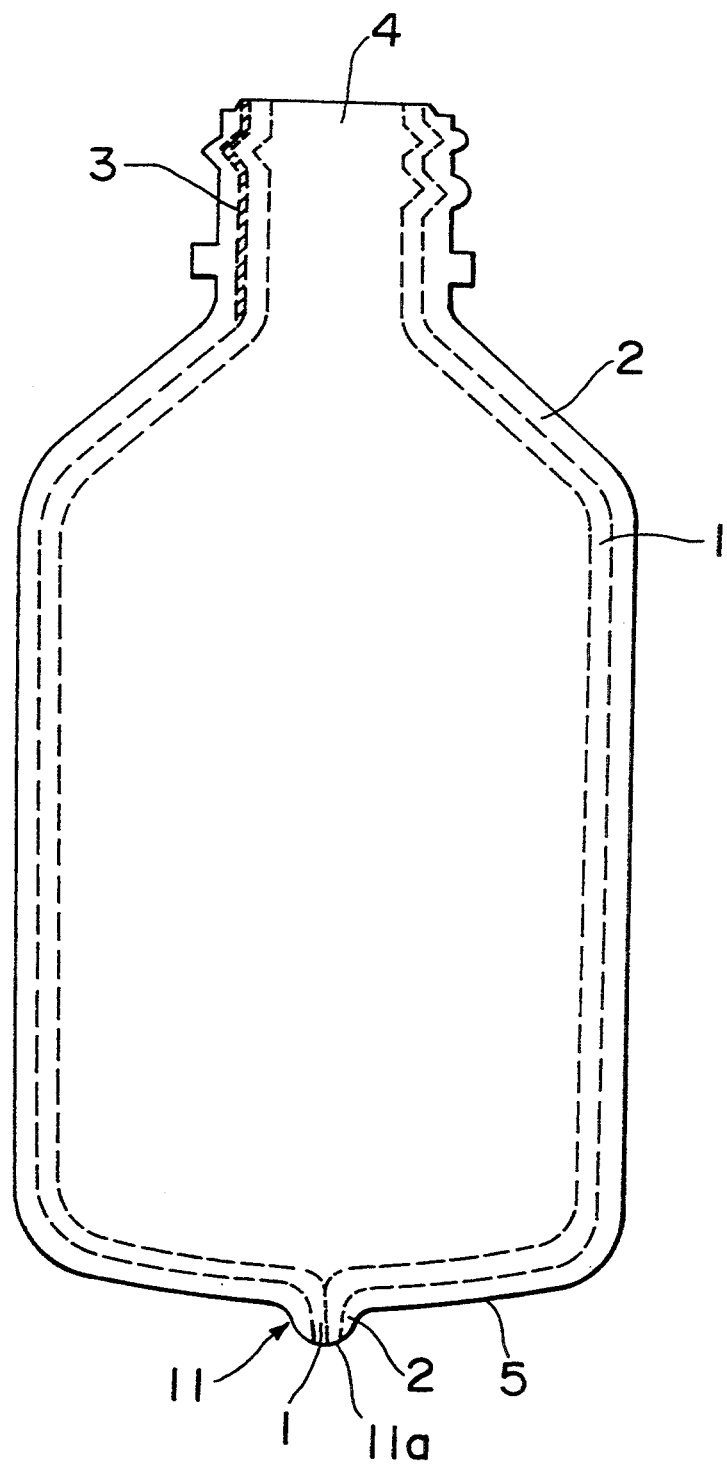
FIG. 8 is a schematic sectional view illustrating a structure of a multilayer bottle according to a sixth embodiment of this invention.

FIG. 8 shows a sixth embodiment of this invention. The multilayer bottle comprises two layers including the inner layer 1 and the outer layer 2. The inner layer 1 and the outer layer 2 are adhered to each other through the adhesion layer 3 formed on the mouth 4. The outer layer 2 is made of polyethylene. The inner layer 1 is made of nylon. The adhesion layer 3 is made of Admer (trade name).

Figure 9:
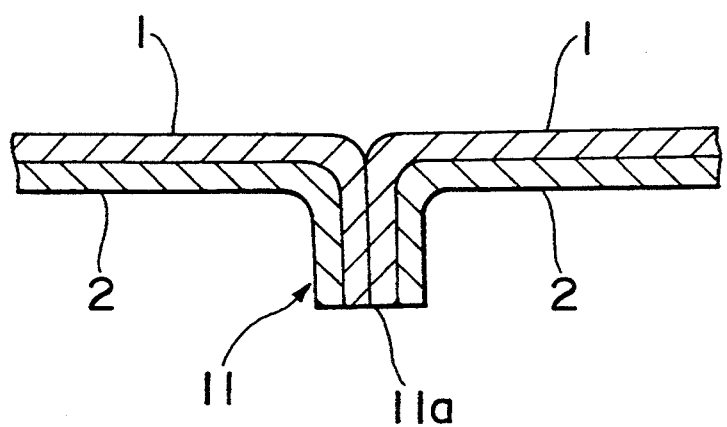
FIG. 9 is an enlarged sectional view of a pinch-off work portion of the multilayer bottle according to the sixth embodiment of this invention.

At the bottom 5 of the bottle, there is formed the pinch-off portion 11 as illustrated in FIG. 9. At the pinch-off work portion 11, both sides of the inner layer 1 are integrated together to close the interior of the bottle. The outer layer 2 is located outside of the inner layer 1. An overlapped section 11a of the inner layer 1 and the outer layer 2 is downwardly projected to be brought into contact with the air.

The bottle according to this embodiment is manufactured as follows.

At first, a multilayer parison of a cylindrical shape comprising the inner layer 1, the adhesion layer 3, and the outer layer 2 is molded by extrusion molding. That is, the extrusion-molded multilayer parison is set in a mold for use in blow molding and is molded by blow molding.

In this event, the multilayer parison is extruded and enclosed in the mold from both sides and an air is blown to perform molding. In the process of closing the mold, said multilayer parison is cut at the bit-off portion of the mold. When the portion bit off by the bit-off work portion is further cut, the pinch-off work portion 11 is formed on the bottom 5 of the bottle, at which pinch-off work portion the overlapped section 11a of the inner layer 1 and the outer layer 2 is exposed outside. Thus, the bottle having the shape of this embodiment is obtained.

This bottle is adapted for storing a liquid, which is a substance in the content, of the type being liable to volatilize even if the bottle is tightly sealed. When a long time has passed after such content is filled, for example, oxygen and the like in said content volatilize to thereby reduce a pressure in the bottle.

In this event, the air enters into the separated part through the exposed overlapped section 11a of the inner layer 1 and the outer layer 2, and the inner layer 1 is readily separated from the outer layer 2. Thus, the inner layer 1 alone is contracted and deformed while the configuration of the outer layer 2, namely, the bottle body is not affected at all.

In this embodiment, the outer layer 2 is made of polyethylene (trade name: CALP) containing calcium carbonate while the inner layer 1 is made of nylon. With this structure, excellent separability is obtained.

Figure 10:
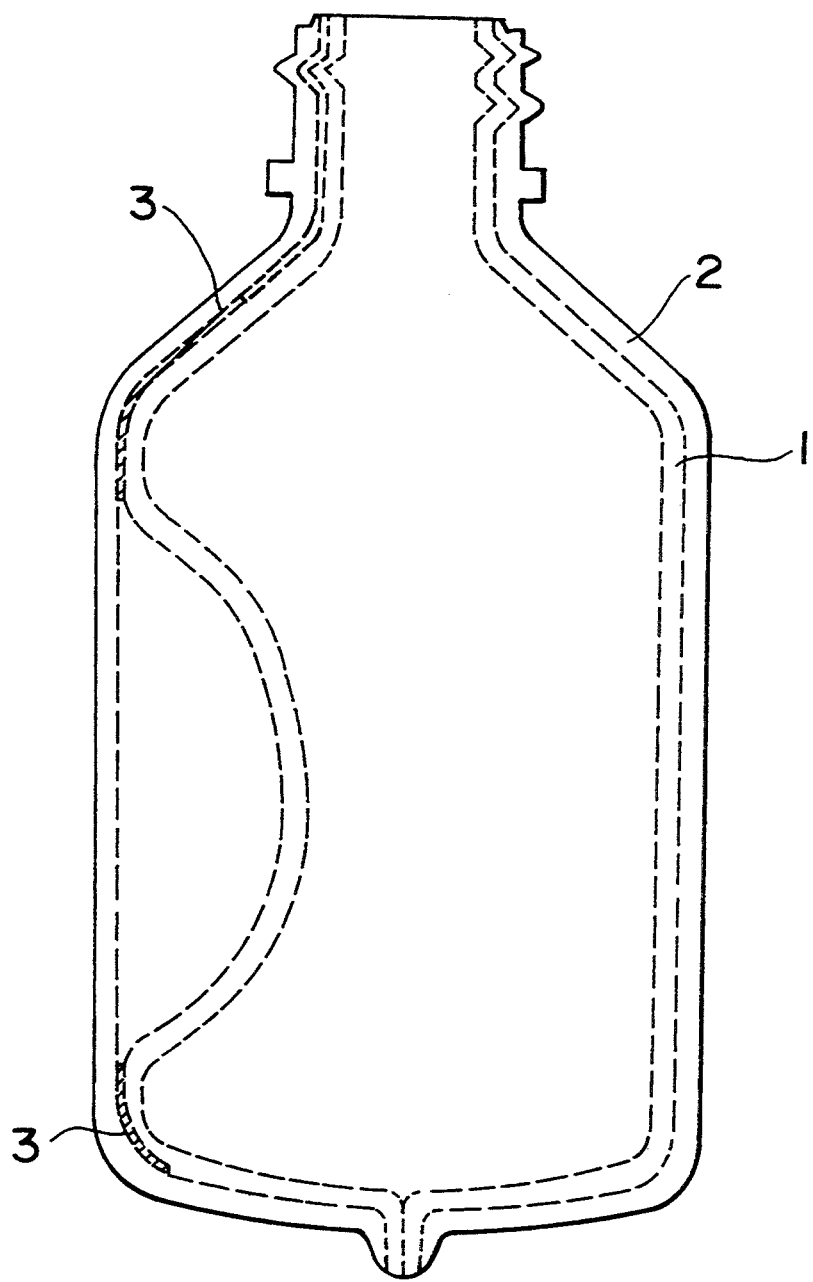
FIG. 10 is a view illustrating a structure of another multilayer bottle.
Figure 11:
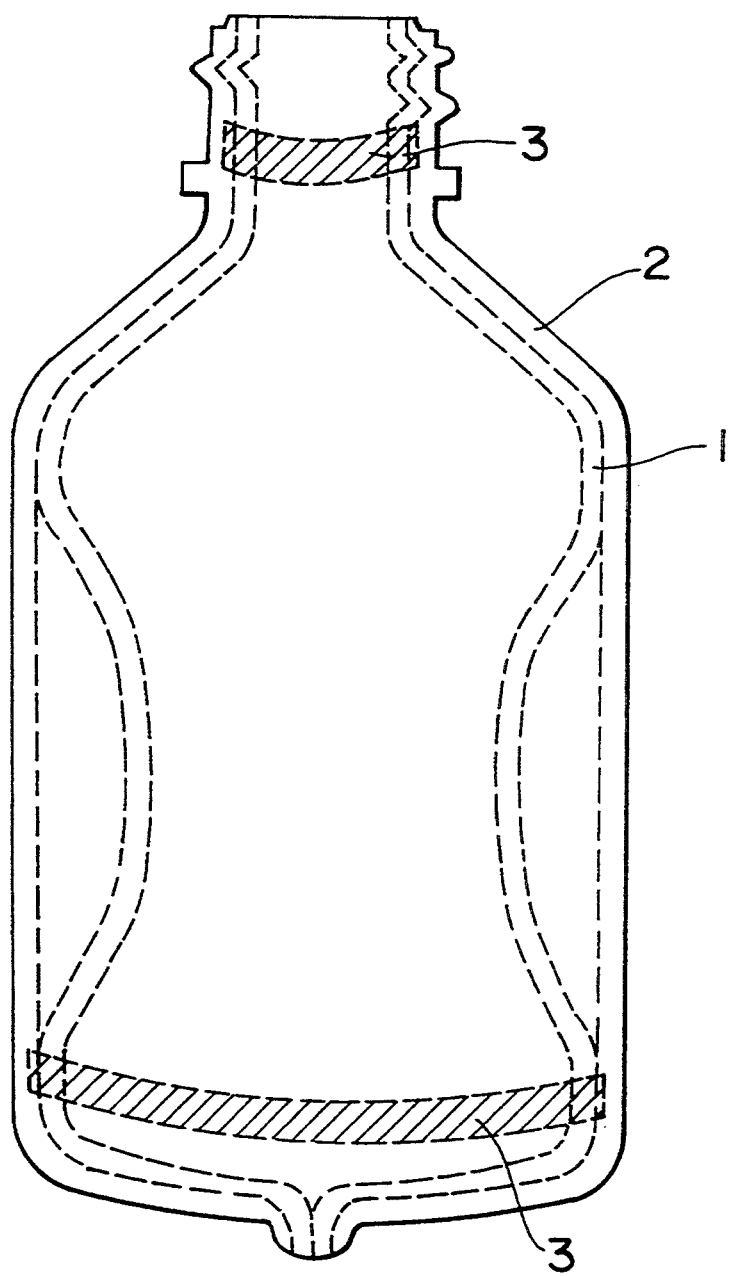
FIG. 11 is a view illustrating a structure of still another multilayer bottle.
Figure 12:
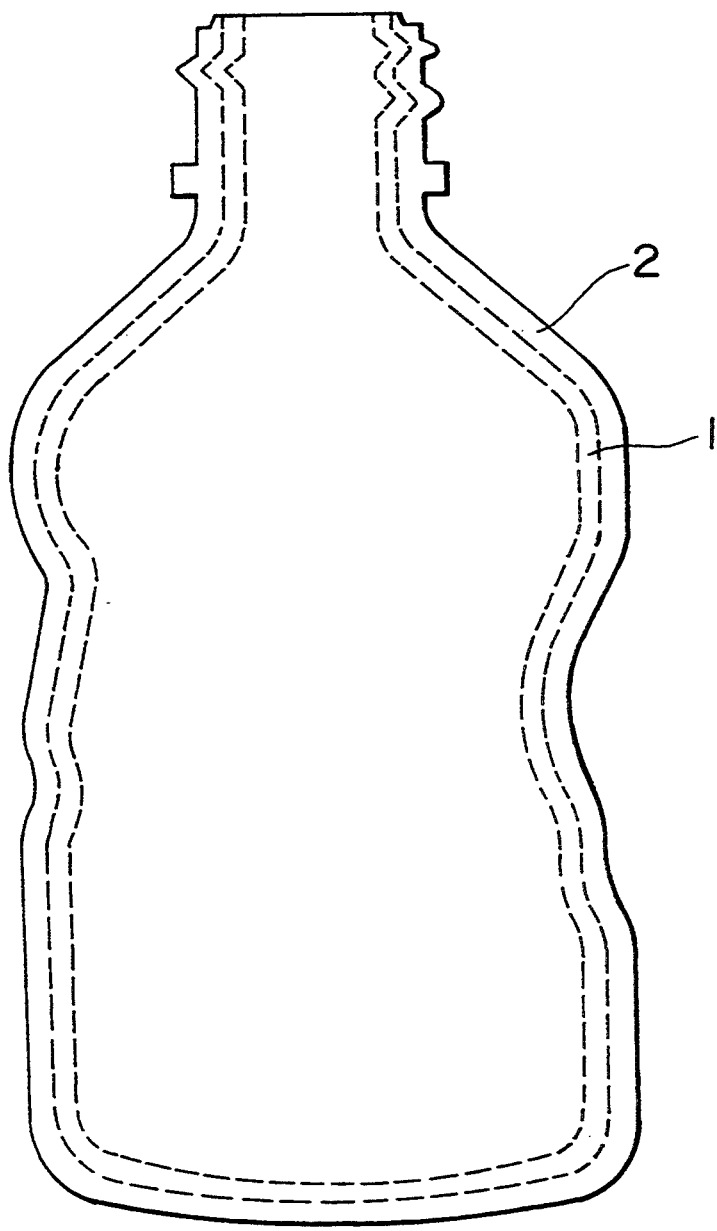
FIG. 12 is a view for describing the distortion of a conventional multilayer bottle.

Such pinch-off portion 11 is applicable to the bottles illustrated in FIGS. 1 and 2. As illustrated in FIGS. 10 and 11, it is also applicable to the bottles in the third and the fourth embodiments described above.

Industrial Applicability

This invention is useful as a container for accommodating a content including a volatile component, for example, as a bottle for accommodating agricultural chemicals which may possibly be decreased in volume due to volatilization and the like, or a container for accommodating cosmetics, medicines and the like. As described above, this invention is also useful as a container with a discharge pump, which is attached to the mouth, for pumping up and discharging the content therein.

We claim:

1. A multilayer bottle, comprising:
    an outer layer having a bottom portion, an intermediate portion and a mouth portion; and
    a deformable inner layer that is separable from the outer layer when the contents of the inner layer are discharged from the bottle, the inner layer having a first portion adhered to said mouth portion of said outer layer, and at least one additional portion adhered to said outer layer at a location spaced away from said mouth portion, said first and at least one additional portions extending linearly in a longitudinal axial direction of the bottle.

2. The bottle of claim 1, further comprising an aperture formed in said outer layer at a portion of the outer layer not adhered to the inner layer, said aperture allowing air from outside the bottle to enter a space between the outer and inner layers, said space being formed when the contents of the inner layer are discharged from the bottle.

3. A multilayer bottle, comprising:
    an outer layer having a bottom portion, an intermediate portion and a mouth portion;
    a pinch-off portion formed on said bottom portion; and
    a deformable inner layer that is separable from the outer layer when the contents of the inner layer are discharged from the bottle, the inner layer having a first portion adhered to said mouth portion and a second portion adhered to said pinch-off portion.

4. A multilayer bottle, comprising:
    an outer layer having a bottom portion, an intermediate portion and a mouth portion;
    a deformable inner layer that is separable from the outer layer when the contents of the inner layer are discharged from the bottle, the inner layer having a first portion adhered to said mouth portion; and
    an aperture formed in said outer layer at a portion of the outer layer not adhered to the inner layer, said aperture allowing air from outside the bottle to enter a space between the outer and inner layers, said space being formed when the contents of the inner layer are discharged from the bottle,
    wherein overlapping portions of the inner and outer layers are exposed to air outside the bottle at an overlapping section of the bottle, air from outside the bottle being allowed to enter said space between the outer and inner layers at said overlapping section.

5. The bottle of claim 4, further comprising a pinch-off portion formed on said bottom portion, said inner layer further comprising a second portion adhered to said pinch-off portion.

6. The bottle of claim 4, wherein said inner layer further comprises a second portion adhered to said bottom portion of said outer layer.

7. A multilayer bottle, comprising:
    an outer layer having a bottom portion, an intermediate portion and a mouth portion;
    a deformable inner layer that is separable from the outer layer when the contents of the inner layer are discharged from the bottle, the inner layer having a first portion adhered to said mouth portion; and
    an aperture formed in said outer layer at a portion of the outer layer not adhered to the inner layer, said aperture allowing air from outside the bottle to enter a space between the outer and inner layers, said space being formed when the contents of the inner layer are discharged from the bottle,
    wherein overlapping portions of the inner and outer layers are exposed to air outside the bottle at an overlapping section of the bottle, said overlapping section forming a pinch-off portion on said bottom portion of said outer layer, air from outside the inner layers at said overlapping section.

8. A multilayer bottle, comprising:

an outer layer having a bottom portion, an intermediate portion and a mouth portion;

a deformable inner layer that is separable from the outer layer when the contents of the inner layer are discharged from the bottle, the inner layer having a first portion adhered to said mouth portion and a second portion adhered to said intermediate portion adjacent said bottom portion; and an aperture formed in said outer layer at a portion of the outer layer not adhered to the inner layer, said aperture allowing air from outside the bottle to enter a space between the outer and inner layers, said space being formed when the contents of the inner layer are discharged from the bottle.

* * * * *